United States Patent [19]

Kurei

[11] 4,335,946
[45] Jun. 22, 1982

[54] CONTROLLED DISENGAGING DEVICE IN AUTOMATIC EXPOSURE CAMERA OF THE LENS STOP VALUE CONTROL TYPE

[75] Inventor: Hiroshi Kurei, Kawagoe, Japan

[73] Assignee: Asahi Kogaku Kogyo Kabushiki Kaisha, Tokyo, Japan

[21] Appl. No.: 874,674

[22] Filed: Feb. 2, 1978

[30] Foreign Application Priority Data

Feb. 25, 1977 [JP] Japan .................. 52-22073[U]

[51] Int. Cl.³ .................. G03B 9/02; G03B 9/32
[52] U.S. Cl. .................. 354/228; 354/242; 354/271
[58] Field of Search ........ 354/36, 38, 40, 43, 354/231, 232, 241, 242, 246, 247, 152, 156, 271, 272

[56] References Cited

U.S. PATENT DOCUMENTS

| | | | |
|---|---|---|---|
| 3,777,637 | 12/1973 | Kuramoto et al. | 354/44 X |
| 3,864,700 | 2/1975 | Mielke | 354/43 |
| 3,950,767 | 4/1976 | Matsui | 354/43 X |
| 3,952,316 | 4/1976 | Kobori | 354/40 |
| 3,972,055 | 7/1976 | Matsuda et al. | 354/40 X |
| 4,014,034 | 3/1977 | Imura | 354/152 |
| 4,079,387 | 3/1978 | Kawamura et al. | 354/38 X |

FOREIGN PATENT DOCUMENTS

| | | | |
|---|---|---|---|
| 2133212 | 1/1972 | Fed. Rep. of Germany | 354/38 |
| 2647347 | 4/1977 | Fed. Rep. of Germany | 354/152 |

Primary Examiner—L. T. Hix
Assistant Examiner—William B. Perkey
Attorney, Agent, or Firm—Sughrue, Mion, Zinn, Macpeak & Seas

[57] ABSTRACT

An automatic exposure camera of the lens stop value control type is provided with a controlled disengaging device operated in association with the bottom shutter curtain running operation. The disengaging device releases the lens stop mechanism so that the operator can confirm the depth of field after an exposure has been made but before the winding operation.

1 Claim, 5 Drawing Figures

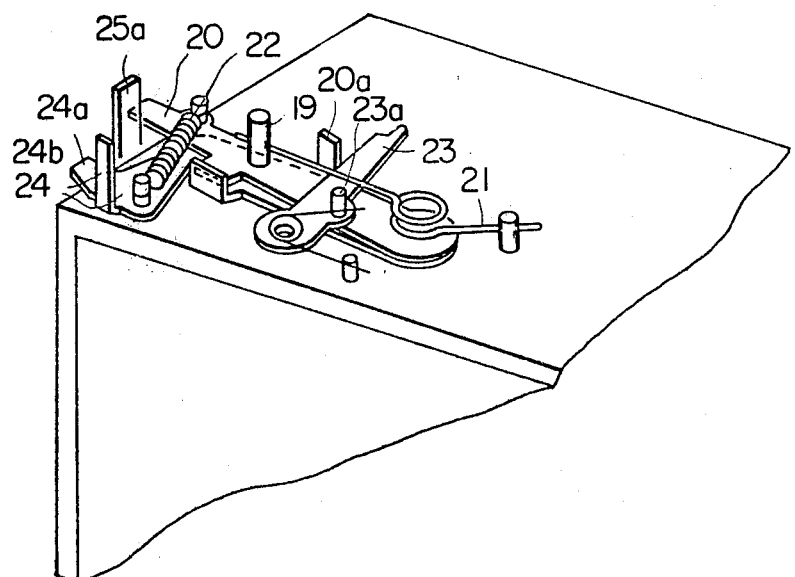
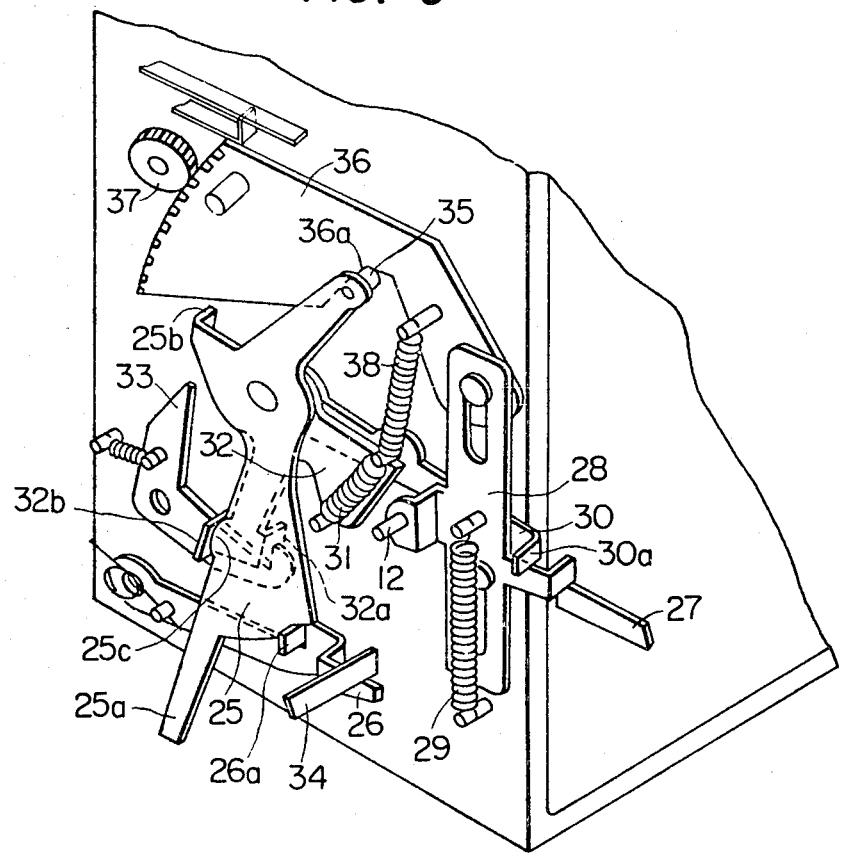

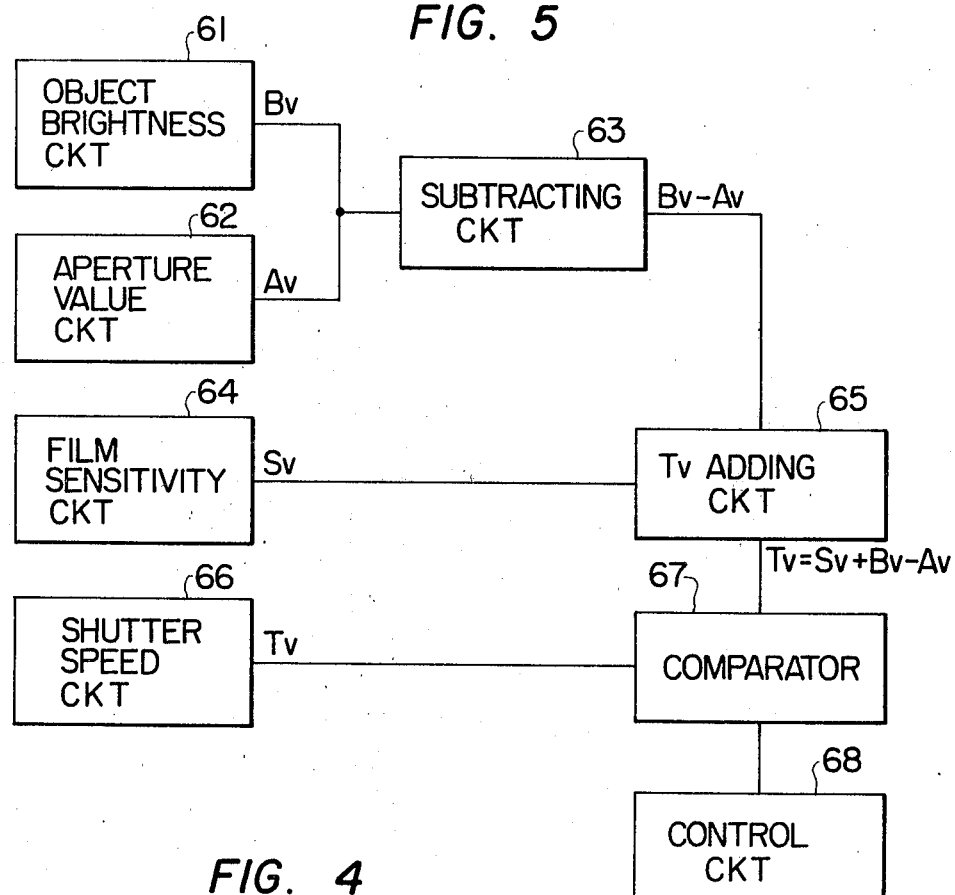
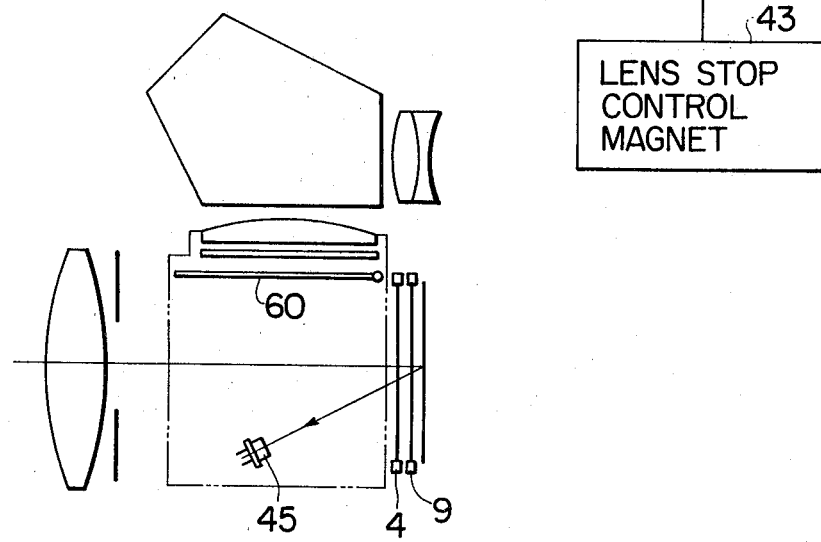

CONTROLLED DISENGAGING DEVICE IN AUTOMATIC EXPOSURE CAMERA OF THE LENS STOP VALUE CONTROL TYPE

BACKGROUND OF THE INVENTION

The present invention generally relates to automatic exposure cameras of the lens stop value control type, and more particularly to an improvement in such cameras which permits the operator to confirm the depth of field after an exposure has been made but before the winding operation.

In an automatic exposure camera of lens stop control type, there is a mechanism in which after release of the shutter, a control member is engaged with a member operating in association with the lens stopping operation by deenergizing a lens stop control magnet. With such a camera, the control member for lens stop control must be disengaged from the member operating in association with the lens stopping operation so as to be ready for the next photographing operation; however, this disengagement is, in general, carried out in association with the next winding operation. With the camera thus constructed, it is possible to make a preview operation for confirming the depth of field after the winding operation has been completed; however, it is impossible to confirm the depth of field before the winding operation because the lens stop is maintained controlled.

SUMMARY OF THE INVENTION

Accordingly, an object of this invention is to eliminate the above-described difficulty. This is accomplished by providing a controlled disengaging device which is operated in association with the bottom shutter curtain running operation.

More specifically, an automatic exposure camera includes a slow speed mechanism which operates to increase the displacement of an operating member actuated by a lens stopping operation. When the lens stop value reaches a computed value for proper exposure, the operation of the slow speed mechanism is stopped by deenergization of a lens stop magnet to release a control lever which engages the slow speed mechanism. Thereafter, the top, or front shutter curtain is released and, after a preset time, the bottom, or rear shutter curtain is released to make the exposure. The improvement according to the invention comprises a second operating member which is operated by the running of the bottom shutter curtain to disengage the control lever from the slow speed mechanism.

BRIEF DESCRIPTION OF THE DRAWINGS

In the drawings:

FIG. 2 is a perspective view showing a lower mirror operating mechanism;

FIG. 3 is a perspective view showing a side mirror operating mechanism;

FIG. 4 is a sectional view illustrating an arrangement of a light receiving element; and FIG. 5 is a block diagram showing a control circuit.

DETAILED DESCRIPTION OF THE INVENTION

Figure 1:
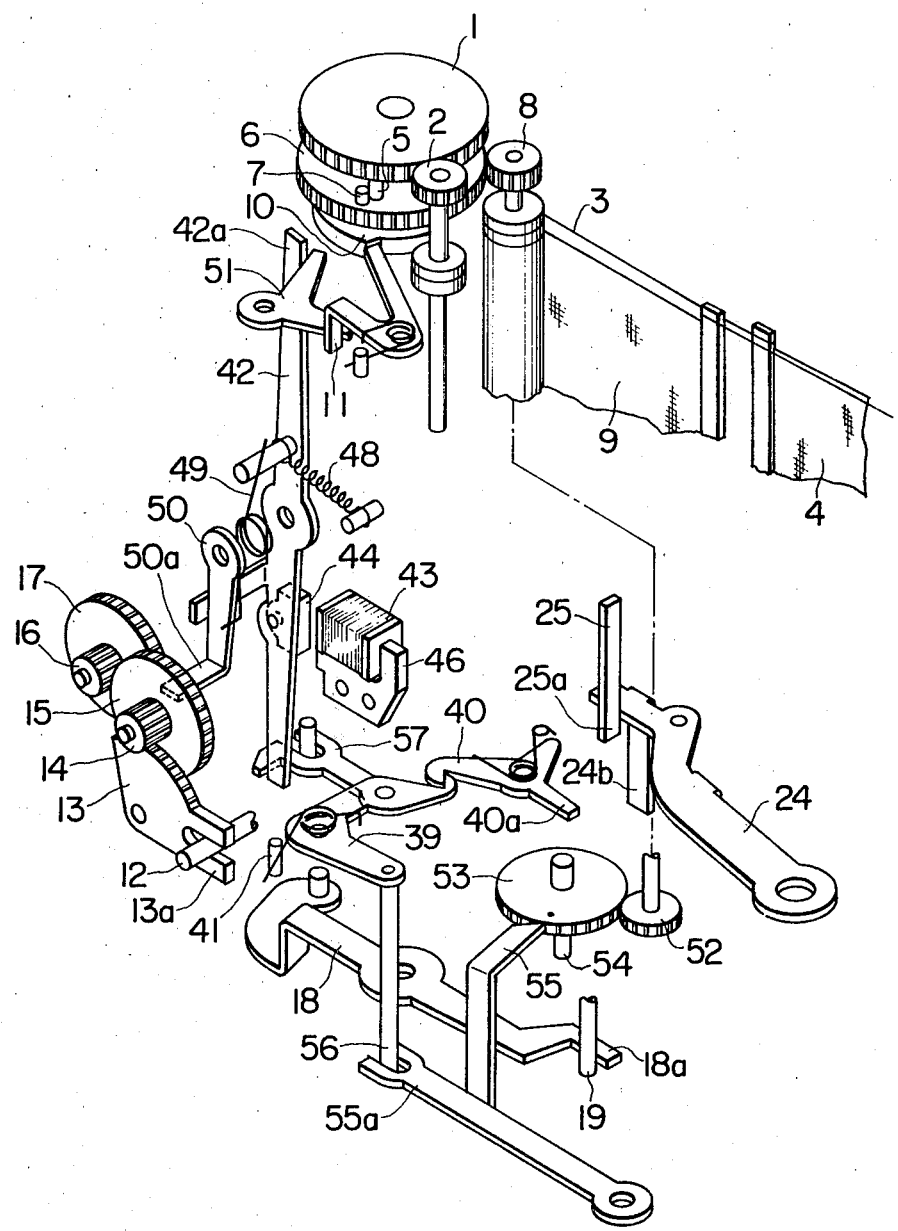
FIG. 1 is a perspective view showing a lens stop control section, a top curtain locking section, and a charge section according to this invention.

With reference to FIG. 1, an automatic exposure camera of the lens stop value type includes an upper speed change gear 1 which is rotated by a winding operation. A top curtain 4 is charged through a pulling member 3 by a top curtain pinion 2 engaged with the upper speed change gear 1. A power speed change gear 6 is rotated by a pin secured to the gear 1 and a pin 7 fixedly secured to the lower speed change gear 6, and a bottom curtain 9 is charged by a bottom curtain pinion 8. The positional relationship of a top curtain locking cam 10 integral with the upper speed change gear 1 and a stop curtain locking lever 11 is so determined that the top curtain locking cam 10 engages the top curtain locking lever 11 when the winding operation is completed.

Further, the camera includes a slow speed mechanism which engages a coupling pin 12 operated in association with a lens stop release plate (27 in FIG. 3) described later. The coupling pin 12 engages a long slot 13a in a sector-shaped gear 13. The sector-shaped gear 13 engages a first pinion gear 14, and its operation is transmitted to a ratchet wheel 17 through a spur gear 15 and a second pinion gear 16. The object of the slow speed mechanism is to increase the operational displacement of the lens stop release plate 27 so as to improve the control accuracy and to reduce the locking force so as to improve the durability.

Referring to FIGS. 1, 2 and 3, the mirror box mechanism includes a charge lever 18 which is turned clockwise by the winding operation. In this operation, as a pin 19 engaging one end portion 18a of the charge layer 18 is fixedly secured to a driving lever 20, the lever 20 is turned clockwise energizing a restoring spring 21 and a mirror lifting spring 22, and a locking section 20a engages a second locking lever 23. Thus, the charging operation is completed. When the driving lever 20 is turned clockwise, a first operating lever 24 is allowed to turn clockwise through the mirror lifting spring 22, while the one end portion 25a of a second operating lever 25 is displaced to the right as viewed in FIG. 2 by the one end portion 24a of the operating lever 24; however, the lever 25 is locked by a bent portion 26a of a first locking lever 26, and therefore the mirror lifting spring 22 is energized.

On the other hand, the lens stop release plate 27 is energized in a lens-stopping direction (upward in FIG. 3), and a force is applied to a slide plate 28 engaging the lens stop release plate so that the plate 28 is displaced against a restoring spring 29; however, the plate 28 is retained by a bent portion 30a of a restoring lever 30. This restoring lever 30 is engaged with a lever 32 through a coupling spring, and a bent portion 32a of the lever 32 is locked by a third locking lever 33.

FIG. 4 shows the finder observing mirror 60 moved upward. A light receiving element 45 is disposed in the lower part of the mirror box and out of the photographic incident light path. Reflection treatment is applied to the photographing lens side of the top curtain so that its reflectance is equivalent to that of the film. The light receiving element is so arranged as to intercept the reflected light from the top curtain 4.

FIG. 5 is a block diagram showing an electrical control circuit. An object brightness circuit 61 including the light receiving element 45 generates an output voltage proportional to the APEX brightness value $B_V$. An aperture value circuit 62 is coupled to the lens stopping mechanism and generates an output voltage proportional to the APEX aperture value $A_V$ of the lens. During the lens stopping operation, both the voltages from the circuits 61 and 62 will vary. These voltages are subtracted in subtracting circuit to produce a voltage proportional to $B_V-A_V$. A voltage proportional to the APEX film sensitivity value $S_V$ is generated by film sensitivity circuit 64. The outputs of circuits 63 and 64 are added by adding circuit 65 to solve the APEX equation for shutter speed $T_V=S_V+B_V-A_V$. Those skilled in the art will recognize that for a preset shutter speed, the above APEX equation is an indirect solution of the aperture value for correct exposure at the preset shutter speed. Therefore, the output of circuit 65 is compared with the output of shutter speed circuit 66 which is preset with a desired shutter speed. This comparison is performed by comparator 67, and when the outputs of circuits 65 and 66 are equal, a control circuit 68 receives an indication of this condition from comparator 67. The control circuit 68 then deenergizes the lens stop control magnet 43.

Now, the operation of the camera will be described beginning at the release operation. In association with the depression of a release button (not shown) a release lever 34 is moved downward as viewed in FIG. 3, as a result of which the first locking lever 26 is turned clockwise and is disengaged from the second operating lever 25. Therefore, the first operating lever 24 is turned clockwise as viewed in FIG. 2 by the mirror lifting spring 22, as a result of which the second operating lever 25 is turned counter-clockwise as viewed in FIG. 3. A pin 35 fixedly secured to the second operating lever 25 is brought into contact with a cam-shaped portion 36a of a mirror lifting lever 36 to turn the latter 36 clockwikse which turns a mirror lifting gear 37 engaged with a gear provided on the peripheral portion of the lever 36 counter-clockwise and moves a mirror (not shown) upward.

When the operation of the second operating lever 25 is completed, that is, when the upward movement of the mirror is ended, the bent portion 25b kicks the third locking lever 33 to turn the latter 33 clockwise to disengage the lever 32. As a result, the lever 32 and the restoring lever 30 are instantaneously turned counter-clockwise by means of the spring 38. Accordingly, the slide plate 28 retained by the restoring lever 30 starts moving upward to start stopping the lens. By the operation of the coupling pin 12, the slow speed mechanism starts its operation.

On the other hand, referring back to FIG. 1, while a set lever 39 is locked by a locking lever 40 because of the bottom curtain running operation described later, the first operating lever 24 of the mirror box mechanism is turned by the release operation of the camera, whereupon one end portion 40a of the locking lever 40 is kicked by the bent portion 24b of the lever 24. As a result, the set lever 39 is restored by being turned counter-clockwise by the spring 41 instantaneously, and an operating lever 42 tends to turn clockwise; however, in this operation, as a lens stop control magnet 43 has been energized, the rotation of the lever 42 is stopped.

The voltage from adding circuit 65 proportional to the value $T_V$ varies with the light quantity variation due to the lens stop operation, and is compared by comparator 67 with the $T_V$ value of a shutter speed which has been preset manually in shutter speed circuit 66. When these two values become equal to each other, the control circuit 68 interrupts energization of the lens stop control magnet 43. As a result, attraction between an iron core 46 and an armature 43 is released, and the operating lever 42 is turned clockwise by a spring 48, and furthermore simultaneously a ratchet pawl 50 coupled to the operating lever through a spring 49 is moved. Therefore, the locking portion 50a of the ratchet pawl 50 is engaged with the ratchet wheel 17 of the slow speed mechanism, whereupon the lens stop release plate 27 is stopped through the coupling pin 12 and the slide plate 28 thereby to stop the lens stopping operation. The ratchet pawl 50 and the ratchet wheel 17 are so disposed that they are engaged with each other as soon as possible after the energization of the magnet 43 is interrupted. The operating lever is further turned clockwise to kick a relay lever 51 with its one end portion 42a, as a result of which the top curtain locking lever 11 is disengaged from the top curtain locking cam 10 whereby the top curtain 4 starts running. In a period of time set by an exposure time setting mechanism (not shown), the bottom curtain 9 starts running.

the improvement according to the invention will now be described. A gear 53 engages a rear curtain pinion 52 and is turned with the running of the bottom curtain 9. When the bottom curtain running operation is ended, a pin 54 fixedly secured to the gear 53 kicks a second charge lever 55 to turn the latter 55 counter-clockwise. Accordingly, the set lever 39 is turned clock-wise through a pin 56 by a fork-shaped portion 55a of a restoring lever 55 and is engaged with a locking lever 40. At the same time, an auxiliary set lever 57 is moved to the right as viewed in FIG. 1 to turn the operating lever 42 counter-clockwise, as a result of which the armature 44 is brought into contact with the magnet core 46, and the ratchet pawl 50 is disengaged from the ratchet wheel 17. Thus, the state of the camera has returned to its initial state where the release operation is started. The bottom curtain runs further, so that in FIG. 2 the pin 23a fixedly secured to the second locking lever 23 is kicked and turned clockwise, thereby disengaging the driving lever 20. As a result, the driving lever 20 is restored by means of the restoring spring 21, and the second operating lever 25 is also restored. Referring to FIG. 3, the bent portion 32b of the lever 32 is depressed by the protrusion 25c of the second operating lever 25 to restore the restoring lever 30 through the coupling spring 31. Therefore, the slide plate 28 is restored, and the lens stop is also restored to its open state. At this time, as the ratchet pawl 50 has been disengaged from the ratchet wheel 17, the restoring operation is effected while operating the slow speed mechanism. Furthermore, the mirror lifting lever 36 is restored by means of the spring 38, and the mirror is therefore restored.

In the preview operation, the pin 47 secured to the slide plate 28 is moved upward by operating an external operating member (not shown) of the camera. Following the upward movement of the slide plate, the lens stop release plate 27 is displaced, thereby stopping the lens. The second operating lever 25 has been locked by the first locking lever 26, while the lever 32 has been retained, and therefore the lever 32 and the restoring lever 30 charge the coupling spring 31. Upon suspension of the external preview operation, the restoring operation is obtained.

In the mechanism according to this invention, when the camera is not operated, the ratchet pawl 50 is maintained disengaged from the ratchet wheel 17, and therefore the preview operation can be made at any time. As is apparent from the above description, according to the invention, releasing the lens stop control locking operation and charging the armature of the lens stop value control magnet are carried out by utilizing the energy which is obtained during the period when the bottom curtain running operation is ended, and the preview operation can be effected irrespective of the time before and after the winding operation. Furthermore, it is possible to restore the mirror operating mechanism, and the slow speed mechanism is operated during the restoring operation, so as to reduce the restoring shock.

What is claimed is:

1. An automatic exposure camera of the lens stop value control type, comprising:

a lens stop release member actuated by a lens stopping operation;

a slow speed mechanism which operates to increase the displacement of said lens stop release member, said slow speed mechanism having a ratchet wheel, a control lever and ratchet pawl biased for engagement with said ratchet wheel;

a lens stop magnet which when energized holds said control lever and ratchet pawl out of engagement with said ratchet wheel;

a set lever pivotable between first and second positions and which, when in said first position holds said control lever in engagement with said lens stop magnet;

a locking lever normally holding said set lever in its first position and releasing said set lever in response to the release operation of the camera;

electrical means for computing a lens stop value for a preset shutter speed and detecting when the lens stop value reaches the computed value, said electrical means deenergizing said lens stop magnet when the lens stop value reaches the computed value thereby releasing said control lever and ratchet pawl to engage said ratchet wheel and stop said slow speed mechanism;

front shutter curtain driving means released by said control lever;

rear shutter curtain driving means released a preset time after the release of said front shutter curtain driving means, said front and rear shutter curtain driving means respectively causing the front and rear shutter curtains to run in front of a film plane to thereby expose a photographic film;

a gear rotated by said rear curtain driving means;

a restoring lever coupled to said set lever; and a pin provided on the periphery of said gear for engaging and rotating said restoring lever toward the end of the running of said rear shutter curtain, whereby said set lever is rotated to its first position and held there by said locking lever, thus disengaging said control lever and ratchet pawl from said ratchet wheel and thereby releasing said slow speed mechanism.

* * * * *